US009930082B2

United States Patent
Ibarria

(10) Patent No.: US 9,930,082 B2
(45) Date of Patent: Mar. 27, 2018

(54) METHOD AND SYSTEM FOR NETWORK DRIVEN AUTOMATIC ADAPTIVE RENDERING IMPEDANCE

(71) Applicant: NVIDIA Corporation, Santa Clara, CA (US)

(72) Inventor: Lawrence Ibarria, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 459 days.

(21) Appl. No.: 13/682,629

(22) Filed: Nov. 20, 2012

(65) Prior Publication Data

US 2014/0143297 A1  May 22, 2014

(51) Int. Cl.
*H04L 29/06* (2006.01)
*H04L 12/841* (2013.01)
(Continued)

(52) U.S. Cl.
CPC .............. *H04L 65/60* (2013.01); *H04L 47/25* (2013.01); *H04L 47/283* (2013.01); *H04L 47/32* (2013.01); *H04L 67/10* (2013.01)

(58) Field of Classification Search
CPC ....... G06F 3/145; H04L 47/10; H04L 67/322; H04L 47/2433; H04L 47/2425; H04L 12/66; H04L 47/25; H04L 47/32; H04L 47/283; H04L 67/10; H04N 21/2662; H04N 21/234381
(Continued)

(56) References Cited

U.S. PATENT DOCUMENTS 6,421,050 B1 7/2002 Ruml et al.
6,665,751 B1 12/2003 Chen et al.
(Continued)

FOREIGN PATENT DOCUMENTS

EP 2073552 6/2009
TW 201041401 11/2010
(Continued)

OTHER PUBLICATIONS

Sudhakaran, Sareesh. The Difference between Encoding, Transcoding and Rendering (online). Wolfcrow, Jan. 29, 2013. Retrieved from the Internet: URL: http//web.archive.org/web/20130511025703/http://wolfcrow.com/blog/the-difference-between-encoding-transcoding-and-rendering.

*Primary Examiner* — David Lazaro

(57) ABSTRACT

A system and method for network driven automatic adaptive rendering impedance are presented. Embodiments of the present invention are operable to dynamically throttle the frame rate associated with an application using a server based graphics processor based on determined communication network conditions between a server based application and a remote server. Embodiments of the present invention are operable to monitor network conditions between the server and the client using a network monitoring module and correspondingly adjust the frame rate for a graphics processor used by an application through the use of a throttling signal in response to the determined network conditions. By throttling the application in the manner described by embodiments of the present invention, power resources of the server may be conserved, computational efficiency of the server may be promoted and user density of the server may be increased.

21 Claims, 9 Drawing Sheets

(51) Int. Cl.
  *H04L 29/08* (2006.01)
  *H04L 12/823* (2013.01)
  *H04L 12/825* (2013.01)

(58) Field of Classification Search
  USPC .................. 709/246, 231; 710/56; 715/716
  See application file for complete search history.

(56) References Cited

U.S. PATENT DOCUMENTS

| | | | |
|---|---|---|---|
| 7,404,002 | B1 | 7/2008 | Pereira |
| 7,516,255 | B1 | 4/2009 | Hobbs |
| 7,870,496 | B1 | 1/2011 | Sherwani |
| 8,325,214 | B2 | 12/2012 | Hildreth |
| 8,520,050 | B2 | 8/2013 | Blackburn et al. |
| 8,687,008 | B2 | 4/2014 | Karandikar et al. |
| 8,738,814 | B1 | 5/2014 | Cronin |
| 8,745,280 | B1 | 6/2014 | Cronin |
| 8,886,763 | B2 | 11/2014 | Bose et al. |
| 9,619,916 | B2 | 4/2017 | Steinke |
| 2004/0057381 | A1 | 3/2004 | Tseng et al. |
| 2004/0080533 | A1 | 4/2004 | Nishtala et al. |
| 2004/0167893 | A1 | 8/2004 | Matsunaga et al. |
| 2004/0239681 | A1 | 12/2004 | Robotham et al. |
| 2004/0243257 | A1 | 12/2004 | Theimer |
| 2005/0028222 | A1 | 2/2005 | Megeid |
| 2005/0036546 | A1 | 2/2005 | Rey et al. |
| 2005/0084232 | A1 | 4/2005 | Herberger et al. |
| 2005/0091571 | A1 | 4/2005 | Leichtling |
| 2005/0132264 | A1 | 6/2005 | Joshi et al. |
| 2006/0069799 | A1* | 3/2006 | Hundscheidt et al. ....... 709/232 |
| 2006/0165166 | A1 | 7/2006 | Chou et al. |
| 2006/0184697 | A1 | 8/2006 | Virdi et al. |
| 2006/0200253 | A1 | 9/2006 | Hoffberg et al. |
| 2006/0230171 | A1 | 10/2006 | Dacosta |
| 2006/0282855 | A1* | 12/2006 | Margulis ............... G06F 3/1431 725/43 |
| 2007/0067480 | A1 | 3/2007 | Beek et al. |
| 2007/0126875 | A1* | 6/2007 | Miyamaki ........ G08B 13/19656 348/207.11 |
| 2007/0180106 | A1 | 8/2007 | Pirzada et al. |
| 2007/0201388 | A1 | 8/2007 | Shah et al. |
| 2007/0294173 | A1 | 12/2007 | Levy et al. |
| 2008/0052414 | A1 | 2/2008 | Panigrahi et al. |
| 2008/0055311 | A1 | 3/2008 | Aleksic et al. |
| 2008/0101466 | A1 | 5/2008 | Swenson et al. |
| 2008/0165280 | A1 | 7/2008 | Deever et al. |
| 2009/0207172 | A1 | 8/2009 | Inoue et al. |
| 2009/0222873 | A1 | 9/2009 | Einarsson |
| 2009/0225038 | A1 | 9/2009 | Bolsinga et al. |
| 2009/0252227 | A1 | 10/2009 | NepomucenoLeung et al. |
| 2009/0284442 | A1 | 11/2009 | Pagan |
| 2010/0020025 | A1 | 1/2010 | Lemort et al. |
| 2010/0036963 | A1 | 2/2010 | Gahm et al. |
| 2010/0052843 | A1 | 3/2010 | Cannistraro |
| 2010/0063992 | A1 | 3/2010 | Ma et al. |
| 2010/0064228 | A1 | 3/2010 | Tsern |
| 2010/0135381 | A1* | 6/2010 | Hamamoto et al. ..... 375/240.01 |
| 2010/0169842 | A1 | 7/2010 | Migos |
| 2010/0201878 | A1 | 8/2010 | Barenbrug et al. |
| 2010/0254622 | A1 | 10/2010 | Kamay et al. |
| 2011/0058554 | A1 | 3/2011 | Jain et al. |
| 2011/0106743 | A1 | 5/2011 | Duchon |
| 2011/0255841 | A1 | 10/2011 | Remennik et al. |
| 2011/0263332 | A1 | 10/2011 | Mizrachi |
| 2011/0276710 | A1 | 11/2011 | Mighani et al. |
| 2011/0314093 | A1 | 12/2011 | Sheu et al. |
| 2012/0005365 | A1 | 1/2012 | Ma et al. |
| 2012/0054671 | A1 | 3/2012 | Thompson et al. |
| 2012/0076197 | A1 | 3/2012 | Byford et al. |
| 2012/0092277 | A1 | 4/2012 | Momchilov |
| 2012/0092299 | A1 | 4/2012 | Harada et al. |
| 2012/0092563 | A1 | 4/2012 | Kwon et al. |
| 2012/0250762 | A1 | 10/2012 | Kaye et al. |
| 2012/0254456 | A1 | 10/2012 | Visharam et al. |
| 2012/0262379 | A1 | 10/2012 | King |
| 2012/0265892 | A1 | 10/2012 | Ma et al. |
| 2012/0311043 | A1 | 12/2012 | Chen et al. |
| 2012/0317236 | A1 | 12/2012 | Abdo et al. |
| 2013/0031482 | A1 | 1/2013 | Saul et al. |
| 2013/0093776 | A1* | 4/2013 | Chakraborty et al. ........ 345/520 |
| 2013/0097309 | A1 | 4/2013 | Ma et al. |
| 2013/0107930 | A1 | 5/2013 | Le Faucheur et al. |
| 2013/0111019 | A1 | 5/2013 | Tjew et al. |
| 2013/0120651 | A1 | 5/2013 | Perry |
| 2013/0159393 | A1 | 6/2013 | Imai et al. |
| 2013/0246932 | A1 | 9/2013 | Zaveri et al. |
| 2013/0254330 | A1 | 9/2013 | Maylander et al. |
| 2013/0290858 | A1 | 10/2013 | Beveridge |
| 2013/0300633 | A1 | 11/2013 | Horio et al. |
| 2013/0307847 | A1 | 11/2013 | Dey et al. |
| 2014/0053025 | A1 | 2/2014 | Marvasti et al. |
| 2014/0068520 | A1 | 3/2014 | Missig et al. |
| 2014/0085274 | A1 | 3/2014 | Steinke |
| 2014/0108940 | A1 | 4/2014 | Diercks et al. |
| 2014/0122562 | A1 | 5/2014 | Turner et al. |
| 2014/0143296 | A1 | 5/2014 | Odorovic et al. |
| 2014/0143297 | A1 | 5/2014 | Ibarria |
| 2014/0189091 | A1 | 7/2014 | Tamasi et al. |
| 2014/0380182 | A1 | 12/2014 | Lu et al. |
| 2015/0019670 | A1 | 1/2015 | Redmann |
| 2015/0026309 | A1 | 1/2015 | Radcliffe et al. |
| 2015/0207837 | A1 | 7/2015 | Guerrera et al. |
| 2015/0215359 | A1 | 7/2015 | Bao et al. |
| 2015/0340009 | A1 | 11/2015 | Loeffler et al. |

FOREIGN PATENT DOCUMENTS

| | | |
|---|---|---|
| TW | 201202975 | 1/2012 |
| TW | 201223256 | 6/2012 |
| TW | 201230850 | 7/2012 |

* cited by examiner

Operation 212 of Figure 2A

METHOD AND SYSTEM FOR NETWORK DRIVEN AUTOMATIC ADAPTIVE RENDERING IMPEDANCE

FIELD OF THE INVENTION

Embodiments of the present invention are generally related to the field of graphics processing.

BACKGROUND OF THE INVENTION

When rendering frames using a desktop graphics system, the frame rate of rendering may be controlled by synchronizing the rendering of each frame with the vertical synchronization signal of a display device coupled to the desktop machine. However, when this process is virtualized in a cloud computing environment, a display may not be present to provide these synchronization signals, thus resulting in the server based graphics system rendering frames as fast as possible for an application. In a cloud computing environment, once rendered, these frames are processed and sent over a communication network to a remote client device displaying the frames. The communication network may have limited and varying bandwidth. This issue is especially prevalent within the field of cloud computing given that frames transmitted in such an uncontrolled manner may introduce significant network delay, especially within poor quality networks.

As a result, many frames produced by the server based graphics system are encoded, transmitted and may then be discarded by the server because the frame generation rate exceeds the network communication rate. This situation results in unnecessary power consumption as well as computational inefficiencies in the sense that the server based graphics system utilizes valuable power resources and processing time to produce frames which are ultimately not consumed by the client device. Furthermore, graphics system frame overproduction in this fashion is costly from a financial perspective in the sense that there is also a decrease in the number of users who are able to gain access to hosted virtualized applications, thus, resulting in lower user density. User density drops because the graphics system is busy generating wasted frames and the bandwidth wasted by this activity could otherwise be used to service additional clients.

SUMMARY OF THE INVENTION

Accordingly, a need exists to address the inefficiencies discussed above. Embodiments of the present invention are operable to dynamically throttle the frame rate associated with an application using a server based graphics processor based on determined communication network conditions between the server based application and a remote client. Embodiments of the present invention are operable to monitor network conditions between the server and the client using a network monitoring module and correspondingly adjust the frame rate for a graphics processor used by an application through the use of a throttling signal in response to the determined network conditions. By throttling the application in the manner described by embodiments of the present invention, power resources of the server may be conserved, computational efficiency of the server may be promoted and user density of the server may be increased.

More specifically, in one embodiment, the present invention is implemented as a method of throttling an application in response to a communication network condition. The method includes monitoring the communication network condition using a host device, the host device communicatively coupled to a plurality of client devices over the communication network, in which the host device is operable to monitor the communication network condition in real-time. In one embodiment, the host is a virtual machine, in which the virtual machine is operable to stream the output of multiple instantiations of the application in parallel to the plurality of remote devices over the communication network. In one embodiment, the method of monitoring the network condition further includes determining a network bandwidth of the communication network using a network status signal comprising data associated with the communication network condition.

The method also includes determining a frame generation rate associated with the application using the host device, in which the host device comprises the application and a graphics processor for generating frames for the application at the frame generation rate as well as adjusting the frame generation rate in response to the communication network condition. In one embodiment, the method of adjusting the frame generation rate comprises synchronizing the frame generation rate with a virtualized VBlank signal generated at the host device. In one embodiment, the VBlank signal is generated from a software module resident on the host device. In one embodiment, the method of adjusting the frame generation rate comprises synchronizing the frame generation rate with a virtual VSync signal generated at the host device. In one embodiment, the network status signal is transmitted at fixed time intervals. In one embodiment, the network status signal is transmitted at varying time intervals.

In another embodiment, the present invention is implemented as a host system for throttling the frame rate of an application in response to a network condition. The host system includes a streaming module operable to stream display output data of the application to a client device of a plurality of client devices over a network. The host system also includes a network monitoring module operable to monitor the network condition over the network. In one embodiment, the network monitoring module is further operable to determine a network bandwidth of the network using a network status signal comprising data associated with the network condition. In one embodiment, the network status signal is transmitted at fixed time intervals. In one embodiment, the network status signal is transmitted at varying time intervals.

The system includes a determination module for determining a frame generation rate associated with the application as well as a synchronization module for adjusting the frame generation rate in response to the network condition. In one embodiment, the synchronization module is operable to synchronize the frame generation rate with the presence of a virtualized VBlank signal. In one embodiment, the synchronization module is operable to synchronize the frame generation rate using a virtual VSync signal. In one embodiment, the VBlank signal is generated from a software module on the host system.

In yet another embodiment, the present invention is implemented as a method of dynamically adjusting a frame rate of an application in response to a network condition. The method includes receiving a network status signal comprising data associated the network condition from a network module of a host device, with the host device being coupled to a client device via a network in which the network condition is associated with the network. In one embodiment, the network status signal is operable to determine a network bandwidth of the network.

The method also includes determining a frame generation rate associated with the application using the host device in which the application is resident on the host device as well as dynamically adjusting the frame generation rate in response to the network condition using a signal. In one embodiment, the signal is operable to synchronize the frame generation rate with a virtual VBlank signal. In one embodiment, the signal is operable to synchronize the frame generation rate with a virtual VSync signal. In one embodiment, the virtual VBlank signal is generated from a software module on the host device. In one embodiment, the software module is a display driver.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Exemplary Method for Network Driven Automatic Adaptive Rendering Impedance

Figure 1:
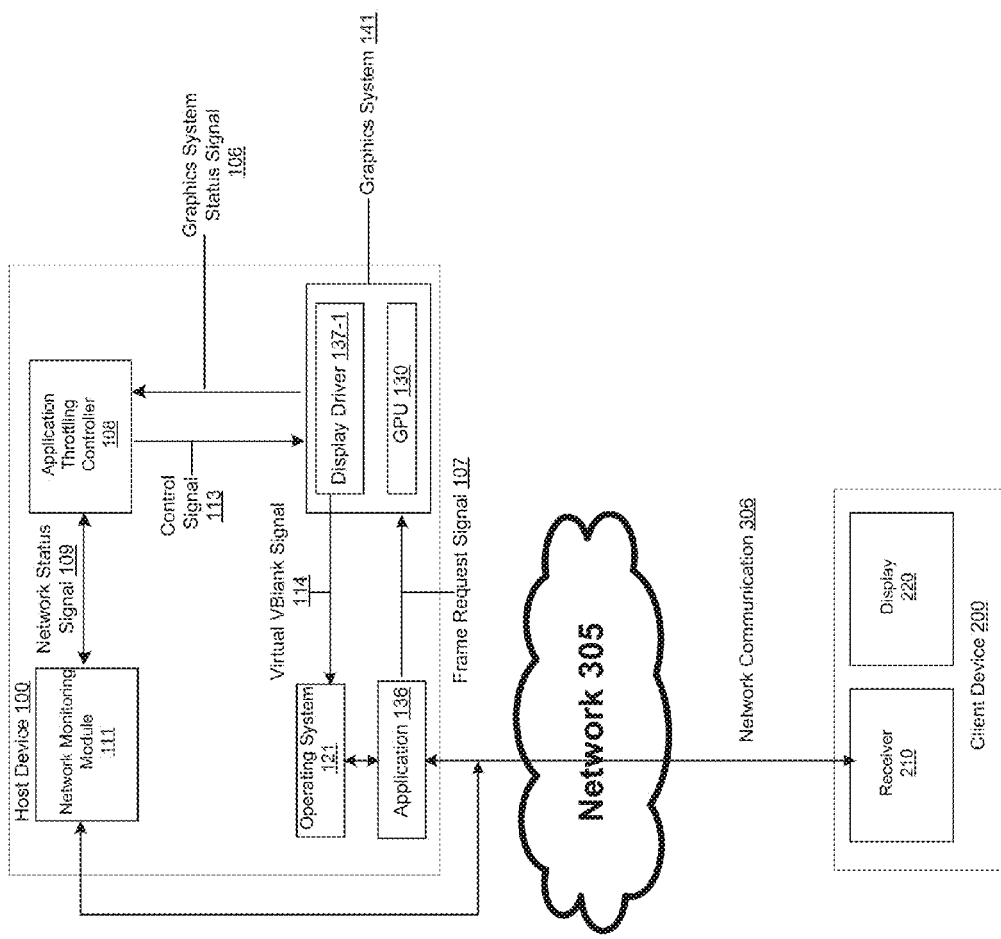
FIG. 1 illustrates a method of throttling a frame rate of an application in response to network conditions in accordance with embodiments of the present invention.

FIG. 1 provides an exemplary network communication between host device 100 and client device 200 in accordance with embodiments of the present invention. FIG. 1 illustrates how embodiments of the present invention are operable to throttle the frame generation rate of a server based graphics system (e.g., graphics system 141) through the use of virtual signals in response to feedback regarding network conditions (e.g., bandwidth usage, network traffic, etc.) of communication network 305.

Embodiments of the present invention are operable to dynamically adjust a frame rate of an application by dynamically gauging network conditions and, based thereon, controlling the frame rate of a server based application that uses a server based graphics processor. Furthermore, embodiments of the present invention may also adjust the frame generation rate with respect to determined network conditions by dynamically adjusting the execution periods of processes executed by the graphics system during the rendering of requested frames. As such, time delays may be introduced into the frame generation process in terms of when the components of the graphics system may respond to a request by an application to begin rendering a new frame.

For instance, if a predetermined low network bandwidth threshold has been reached, there may be a high probability that data packets containing display data generated by graphics system 141 may be delayed or may not reach their respective remote client devices (e.g., client device 200). In one embodiment, in response to these network conditions, a controller (e.g., application throttling controller 108) may send control signals (e.g., control signals 113) to the graphics system 141 which decrease the rate of frame requests made by an application for graphics system 141 to process. These control signals may also directly adjust the rate of frames generated by graphics system 141 in response to the network conditions determined.

Alternatively, if a predetermined low network bandwidth threshold has not been reached, there may be increases in network speed, thus, allowing for a higher probability that a greater number of data packets will reach and be processed by their respective client devices. In response, the application throttling controller 108 may send fewer control signals 113 to the graphics system 141, which in turn, allows graphics system 141 to generate an increased number of frames in proportion to the increased network capabilities (e.g., increased network speed). In this manner, the server based graphics processors (as well as main processors) will avoid spending time on wasted frames. As such, embodiments of the present invention promote better conservation of server power resources as well as server computational efficiency.

In one embodiment, network monitoring module 111 may be implemented as a module residing within host device 100 that is operable to monitor the network conditions (e.g., network traffic, bandwidth usage, etc.) of communication network 305. Application throttling controller 108 may maintain periodic communications with network monitoring module 111 which enables application throttling controller

108 to dynamically gauge network conditions through feedback (e.g., network status signals 109) provided by network monitoring module 111.

In one embodiment, network status signals 109 may provide empirical data regarding the transmission rate of frames requested and/or received by the remote client devices through known or marked communications between the host device and the client devices. In one embodiment, empirical data may include timestamp information provided by client devices and the host device when assigning a sequencing order for network transactions (e.g., timestamps recorded when frames are transmitted from host device 100 and received by the receiver 210 of client device 200).

Figure 3A:
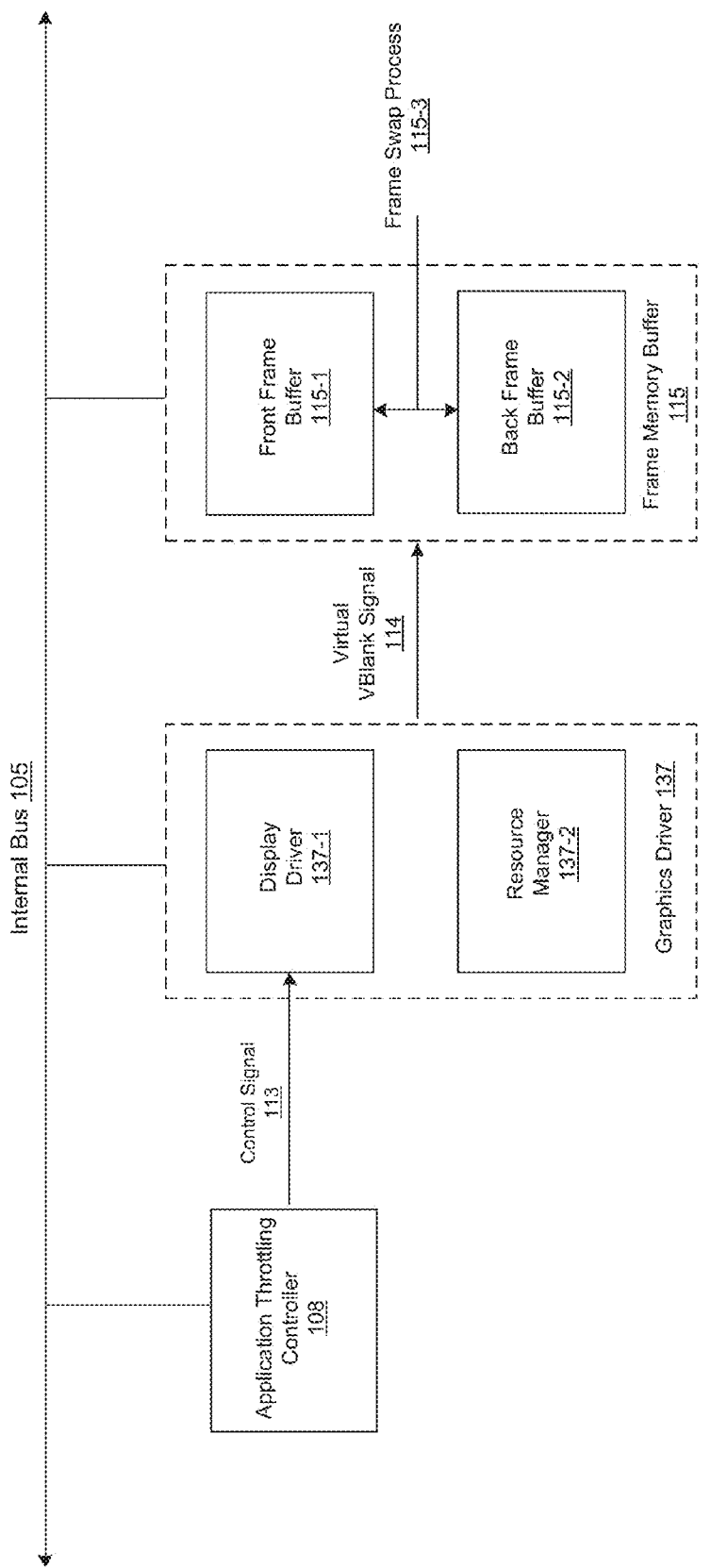
FIG. 3A is a block diagram of an exemplary method of throttling a frame rate of an application in response to network conditions according to embodiments of the present invention.

Also, in response to the data provided by network monitoring module 111, application throttling controller 108 may send control signals 113 to graphics system 141 which may be used to synchronize frame requests issued by an application (e.g., application 236) with virtual VBlank/VSync signals (e.g., virtual VBlank signal 114) produced by a software module of the host device (e.g., display driver 137-1 of FIG. 3A). Once synchronized in this manner, an application may only issue a frame request whenever a virtual VBlank signal is generated.

Furthermore, application throttling controller 108 may also gather empirical data regarding the amount of time graphics system 141 spends generating frames for an application through graphics system status signals 106. In one embodiment, graphics system status signals 106 may provide empirical data regarding the amount of time graphics system 141 spends on processes such as encoding each frame as well as the time spent acquiring frames from the graphics processor and placing the frame into main memory during the rendering process ("frame grabbing"). These delays may also be used in determining the application frame rate.

Therefore, using the data provided by network status signals 109 and graphics system status signals 106, application throttling controller 108 may make adjustments to the amount of time various graphics processing functions (e.g., encoding process, frame grabbing process, etc.) spend executing their respective tasks. Accordingly, by incorporating these adjusted execution periods into the control signals 113 and sending them to graphics system 141, application throttling controller 108 may adjust the frame generate rate of graphic system 141 in response to data provided by network status signals 109.

With further reference to FIG. 1, host device 100 may be implemented as a data center, remote server, or virtualized server. Additionally, embodiments of the present invention support host device 100 being implemented as a remote virtual host server that is communicably coupled to a plurality of remote client devices (e.g., client device 200) over a network (e.g., network 305) and operable to execute multiple instantiations of an application.

Furthermore, network 305 may be an electronic communications network, including wired and/or wireless communication and including the Internet. Embodiments of the present invention are operable to support conventional network protocol configurations (e.g., UDP, TCP/IP, etc.). Network communications 306 may be network sockets created within network 305 that enable both host device 100 and client device 200 to receive and transmit data packets over network 305. Upon receipt of the data packets through network communications, host device 100 may proceed to render data in response to the input provided by client device 200. Rendered output may be then packetized and transmitted by host device 100 back to client device 200 over network 305, through network communications 306, where it is then displayed on the display screen 220 of client device 200. In this embodiment, user interface control or user input data is communicated via network 305 from client 200 to host device 100.

Figure 2A:
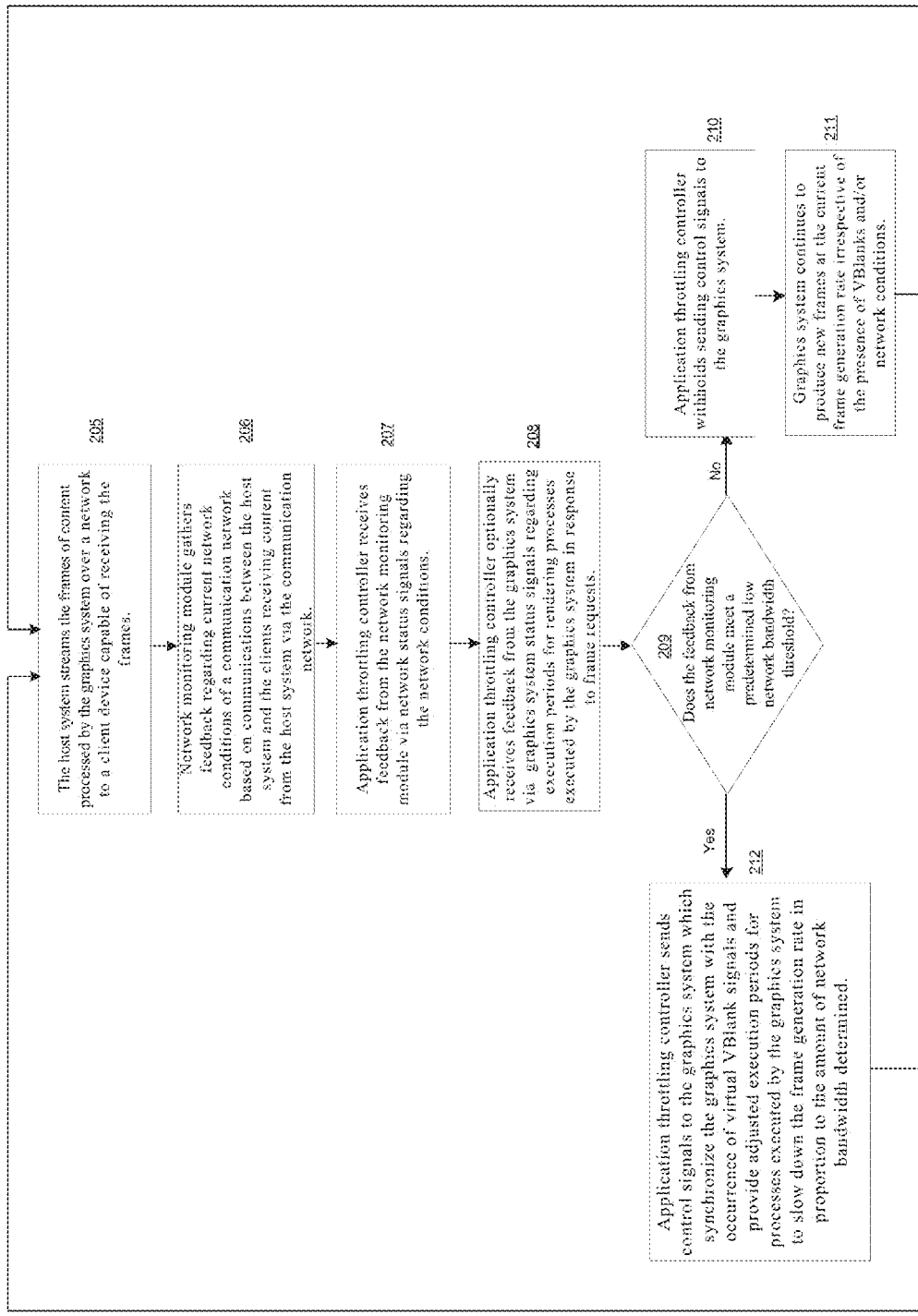
FIG. 2A is a flowchart of an exemplary method of throttling a frame rate of an application in response to network conditions in an embodiment according to the present invention.

FIG. 2A presents a flowchart which describes exemplary operations in accordance with the various embodiments herein described.

At step 205, the host system streams the frames of content processed by the graphics system over a network to a client device capable of receiving the frames.

At step 206, the network monitoring module gathers feedback regarding current network conditions of a communication network based on communications between the host system and the clients receiving the content from the host system via the communication network.

At step 207, the application throttling controller receives feedback from the network monitoring module via network status signals regarding the network conditions.

At step 208, the application throttling controller optionally receives feedback from the graphics system via graphics system status signals regarding execution periods for rendering processes executed by the graphics system in response to frame requests.

At step 209, a determination is made as to whether the feedback from the network monitoring module meets a predetermined low network bandwidth threshold. If the low network bandwidth threshold is met according to the application throttling controller, then the application throttling controller sends control signals to the graphics system, as detailed in step 212. If low network bandwidth usage threshold is not met according to the application throttling controller, then the application throttling controller withholds sending control signals to the graphics system, as detailed in step 210.

At step 210, the low network bandwidth threshold is not met according to the application throttling controller, therefore, the application throttling controller withholds sending control signals to the graphics system.

At step 211, the graphics system continues to produce new frames at the current frame generation rate irrespective of the presence of VBlanks and/or network conditions. Flow returns to step 205 to repeat.

At step 212, the low network bandwidth threshold is met, therefore, the application throttling controller sends control signals to the graphics system which synchronize the graphics system with the occurrence of virtual VBlank signals and provide adjusted execution periods for processes executed by the graphics system to slow down the frame generation rate in proportion to the amount of network bandwidth determined (e.g., the bandwidth may lead slower frame rate, etc.). Flow then returns to step 205 to repeat.

Figure 2B:
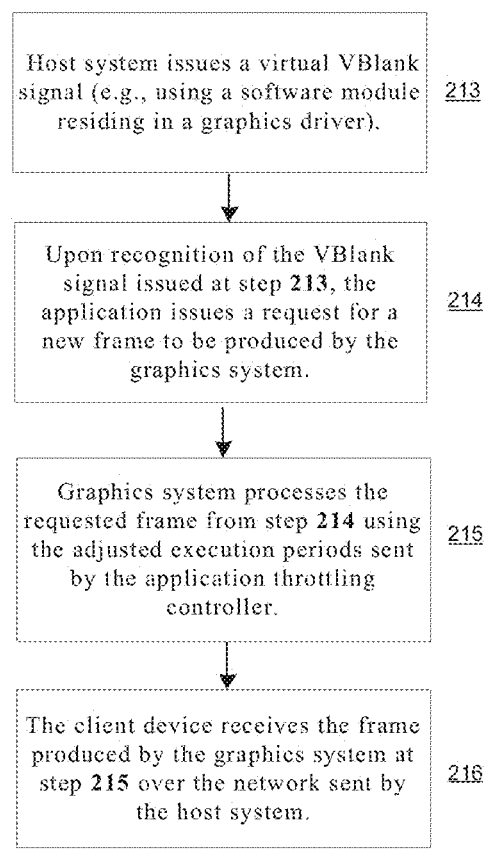
FIG. 2B is another flowchart of an exemplary method of throttling a frame rate of an application in response to network conditions in an embodiment according to the present invention.

FIG. 2B presents a flowchart which describes exemplary operations in accordance with the various embodiments herein described. FIG. 2B depicts how embodiments of the present invention are operable to synchronize the frame generation rate with the issuance of a virtual VBlank signal. The details of operation 212 (see FIG. 2A) are outlined in FIG. 2B.

At step 213, the host system issues a virtual VBlank signal (e.g., using a software module residing in a graphics driver).

At step 214, upon recognition of the VBlank signal issued at step 213, the application issues a request for a new frame to be produced by the graphics system.

At step 215, the graphics system processes the requested frame from step 214 using adjusted execution periods sent by the application throttling controller.

At step 216, client device receives the frame produced by the graphics system at step 215 over the network sent by the host system.

FIG. 3A presents an illustration of how embodiments of the present invention may throttle a frame rate of an application by using control signals (e.g., control signals 113) to synchronize frame processing requests made by an application with the occurrence of a virtual VBlank signal (e.g., virtual VBlank Signal 114) generated by the graphics system. By controlling this process (also known as the "page-flipping process") in this manner, control signals 113 sent by application throttling controller 108 may automatically introduce timing delays into the frame generation process with regard to when the components of the graphics system may respond to a request made by an application to begin rendering a new frame (e.g., rendering a frame in back frame buffer 115-2).

When coupled to an actual display source, resource manager 137-2 may detect VBlank signals provided by the display driver of the display source. Once it detects the signal, resource manager 137-2 may then notify display driver 137-1 of the presence of the VBlank signal, which may then notify an operating system and/or application for further processing. However, when an actual display source is not present, display driver 137-1 may generate or withhold virtual VBlank signals in addition to varying the frequency of their issuance. In the embodiment depicted in FIG. 3A, a display source capable of providing VBlank signals is not present in the server based example. Therefore, display driver 137-1 may be operable to provide virtual VBlank signal 114 for synchronization purposes in accordance with embodiments of the present invention.

Also, with reference to FIG. 3A, application throttling controller 108 determines that a pre-determined threshold level has been met (e.g., network congestion reaches or exceeds a pre-determined threshold level) and therefore sends control signals 113 to display driver 137-1. In response, display driver 137-1 may command frame memory buffer 115 to swap frames rendered in back frame buffer 115-2 to the front frame memory buffer 115-1 whenever a virtual VBlank signal (e.g., virtual VBlank signal 114) is present. Therefore, when virtual VBlank signal 114 is issued by display driver 137-1, frame memory buffer 115 performs frame swap process 115-3 which swaps frames rendered in back frame buffer 115-2 to front frame memory buffer 115-1. At this point, graphics system 141 may now respond to requests made by an application to begin rendering a new frame (e.g., rendering a frame in back frame buffer 115-2).

Figure 3B:
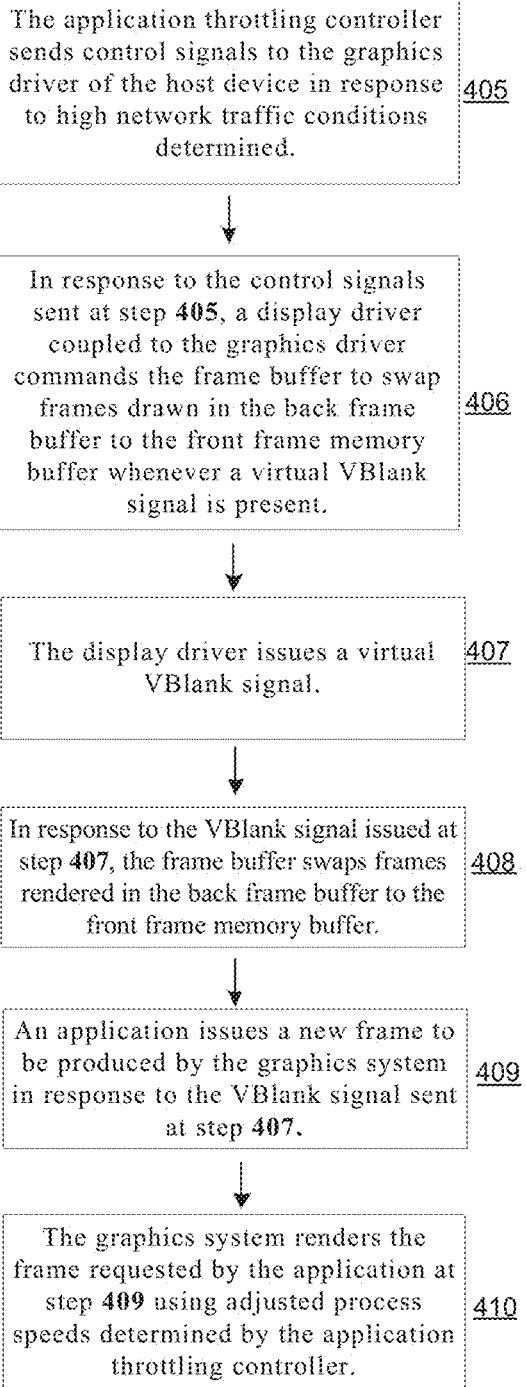
FIG. 3B is another flowchart of an exemplary method of throttling a frame rate of an application in response to network conditions in accordance with embodiments of the present invention.

FIG. 3B presents a flowchart which describes exemplary operations of how embodiments of the present invention may throttle a frame rate of an application by using control signals (e.g., control signals 113) to synchronize frame processing requests made by an application with the occurrence of a virtual VBlank signal generated by the host system. Through this synchronization, embodiments of the present invention may control the frame generation rate of the graphics system in response to determined communication network conditions.

At step 405, the application throttling controller sends control signals to the graphics driver of the host device in response to high network traffic conditions determined.

At step 406, in response to the control signals sent at step 405, a display driver coupled to the graphics driver commands the frame buffer of the graphics system to swap frames drawn in the back frame buffer to the front frame memory buffer whenever a virtual VBlank signal is present. VBlank signals may be transmitted by the display driver at regular intervals or at the request of the network.

At step 407, the display driver issues a virtual VBlank signal.

At step 408, in response to the VBlank signal issued at step 407, the frame buffer swaps frames rendered in the back frame buffer to the front frame memory buffer.

At step 409, an application issues a new frame to be produced by the graphics system in response to the VBlank signal sent at step 407.

At step 410, the graphics system renders the frame requested by the application at step 409 using adjusted process speeds determined by the application throttling controller.

Figure 4A:
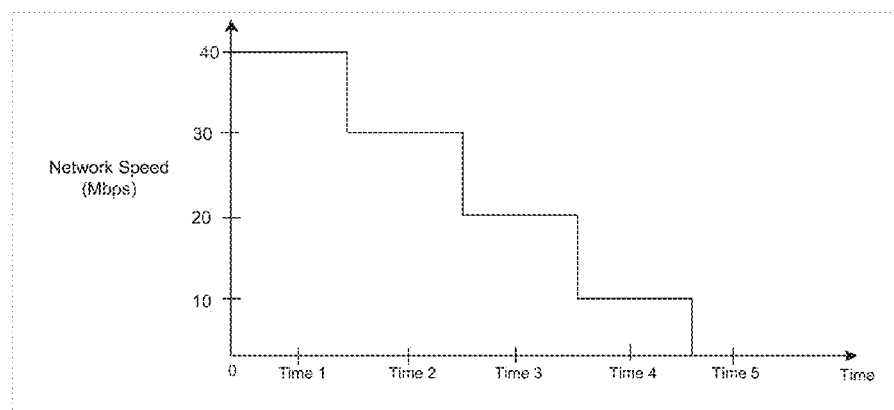
FIG. 4A depicts a timing diagram illustrating an exemplary method of throttling a frame rate of an application in response to network conditions in accordance with embodiments of the present invention.
Figure 4B:
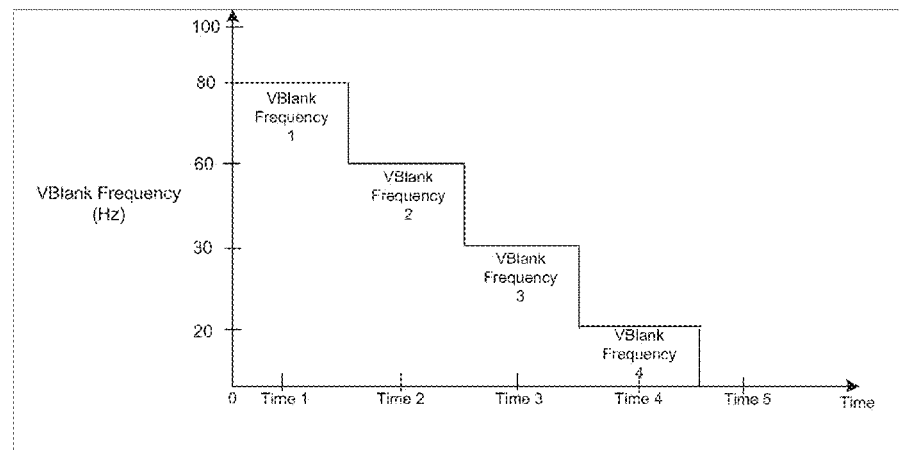
FIG. 4B depicts another timing diagram illustrating an exemplary method of throttling a frame rate of an application in response to network conditions in accordance with embodiments of the present invention.

FIGS. 4A and 4B are timing diagrams illustrating the correlation between the determined network bandwidth of a communication network and the frequency of virtual VBlank signals in accordance with embodiments of the present invention. Furthermore, FIGS. 4A and 4B also illustrate how this correlation may impact the rate of frames generated by the server based graphics system. FIG. 4A illustrates how a network may experience a maximum network bandwidth level (e.g., Time 0) that gradually decreases over a period of time (e.g., Time 1-Time 5). These gradual decreases may be the result of increases in network congestion (e.g., high volume of clients connected to the communication network, large frames being transmitted over the network, etc.).

In correspondence with FIG. 4A, FIG. 4B illustrates how virtual VBlank signals may be issued once a decrease in network bandwidth has been determined by the application throttling controller 108. At Time 0, virtual VBlank signals are not issued due to the availability of maximum network bandwidth. The graphics system may utilize this increase in network speed and process an increased number of frames associated with a server based application. However, once a decrease in network bandwidth has been determined (e.g., at Time 1), virtual VBlank signals at a first frequency (e.g., frequency of 80 Hz) may be issued by the software module of the host device. Upon recognition of the virtual VBlank signals issued, the application may issue a request for a new frame to be produced by the graphics system.

As illustrated in FIG. 4B, with further correspondence to FIG. 4A, as the network bandwidth continues to decrease over time, the software module of the host device may continue to issue VBlank signals at lower frequencies (e.g., 60 Hz, 30 Hz, 20 Hz, etc.) which continue to trigger new frame requests by the application. By decreasing the frequency of the virtual VBlank signals in this manner, the server based graphics processors of the graphics system may generate frames in better proportion to the capabilities of the network.

Exemplary Host Device

Figure 5:
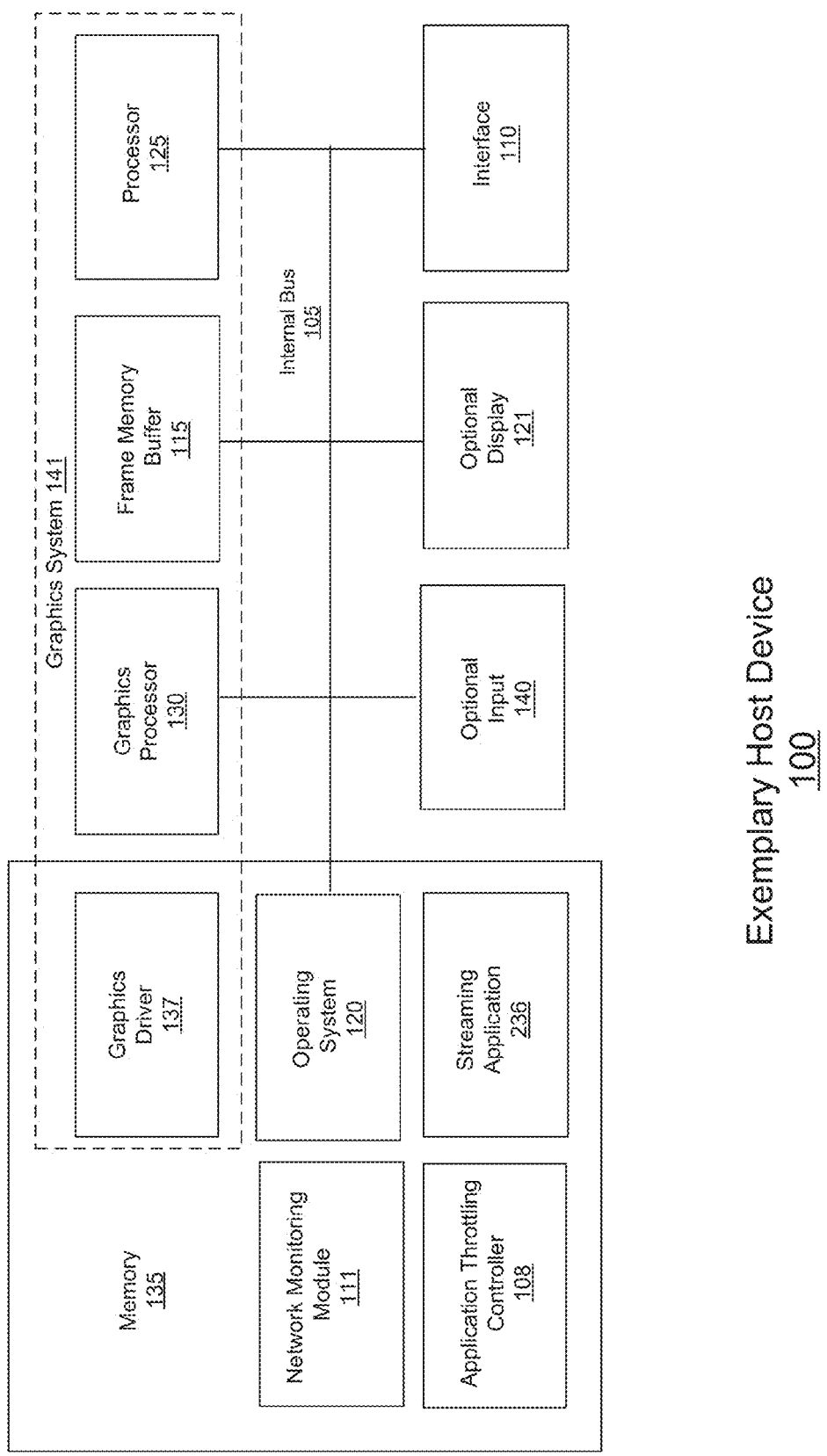
FIG. 5 is a block diagram of an exemplary host device in accordance to embodiments of the present invention.

As presented in FIG. 5, an exemplary host device 100 upon which embodiments of the present invention may be implemented is depicted. Furthermore, exemplary host device 100 may be implemented as data center, streaming server, desktop computer, or the like, as contemplated by embodiments of the present invention. In one embodiment of the present invention, host device 100 may be a virtualized server.

Host device 100 includes processor 125 which processes instructions from an application (e.g., streaming application 236) located in memory 135 to read data received from interface 110 and/or optional input 140 and to store the data in frame memory buffer 115 for further processing via internal bus 105. Optionally, processor 125 may also execute instructions from operating system 120 also located in memory 135. Furthermore, optional input 140 includes devices that communicate user inputs from one or more users to host device 100 and may include keyboards, mice, joysticks, touch screens, and/or microphones.

In one embodiment of the present invention, streaming application 236 may represent a set of instruction that are capable of using user inputs such as touch screen input, in addition to peripheral devices such as keyboards, mice, joysticks, touch screens, and/or microphones, or the like. Operating system 120 may be operable to provide the threaded execution of frames issued by streaming application 236 for processing by graphics system 141. As such, operating system 120 may "hold" frames issued by streaming application 236 until operating system 120 receives a VBlank signal from graphics driver 137. Once received, operating system 120 may then proceed to allow streaming application 236 to issue a frame for processing by graphics system 141. Interface 110 allows host device 100 to communicate with other computer systems (e.g., client devices similar to client device 200 of FIG. 1) via an electronic communications network, including wired and/or wireless communication and including the Internet. The optional display device 121 is any device capable of rendering visual information in response to a signal from host device 100.

In one embodiment, graphics system 141 may comprise graphics driver 137, graphics processor 130 and frame memory buffer 115. Graphics driver 137 may be used to configure graphics processor 130 and assist in generating a stream of rendered data to be delivered to client devices. In one embodiment of the present invention, graphics driver 137 may be comprised of display driver 137-1 and resource manager 137-2. Graphics processor 130 generates pixel data for output images in response to rendering instructions by the application and may be configured as multiple virtual graphic processors that are used in parallel (concurrently) by a number of applications executing in parallel.

Frame memory buffer 115 may be used for storing pixel data for each pixel of an output image. In another embodiment, frame memory buffer 115 and/or other memory may be part of memory 135 which may be shared with processor 125 and/or graphics processor 130. Additionally, in another embodiment, host device 100 may include additional physical graphics processors, each configured similarly to graphics processor 130. These additional graphics processors may be configured to operate in parallel with graphics processor 130 to simultaneously generate pixel data for different portions of an output image, or to simultaneously generate pixel data for different output images.

Network monitoring module 111 may be implemented as a module residing within memory 135 that is operable to monitor network conditions (e.g., monitoring network traffic, bandwidth usage, etc.) of network 305. In one embodiment, network monitoring module 111 may be implemented as a remote device communicably coupled to host device 100 and operable to provide feedback regarding network conditions to application throttling controller 108 in accordance to embodiments of the present invention.

In one embodiment, application throttling controller 108 may be implemented as a module residing within memory 135 that is operable to receive and send control signals to various components within host device 100. In one embodiment, application throttling controller 108 may be implemented as an integrated circuit that is operable to receive and send control signals to various components within host device 100.

In one embodiment, application throttling controller 108 may be implemented to periodically receive signals in the form of network status signals 109 from network monitoring module 111 which enables application throttling controller 108 to dynamically gauge network conditions based on empirical network data gathered by network monitoring module 111. In one embodiment, these network status signals 109 may provide empirical data regarding the transmission rate of frames either requested and/or received by client devices. Embodiments of the present invention support transmission of the network status signals 109 to occur at either fixed or variable time intervals.

In one embodiment, application throttling controller 108 may be operable to periodically send control signals to graphics system 141 to gather empirical data regarding the amount of time graphics system 141 spends generating frames for an application. In one embodiment of the present invention, application throttling controller 108 may determine the amount of time graphics system 141 spends encoding each frame as well as the time spent acquiring frames from graphics processor 130 and performs frame grabbing processes. In one embodiment, application throttling controller 108 may be operable to periodically receive signals from graphics system 141 that provide empirical data regarding the amount of time graphics system 141 spends generating frames for the application. Furthermore, embodiments of the present invention support transmission of these signals to occur at either fixed or variable time intervals.

Figure 6A:
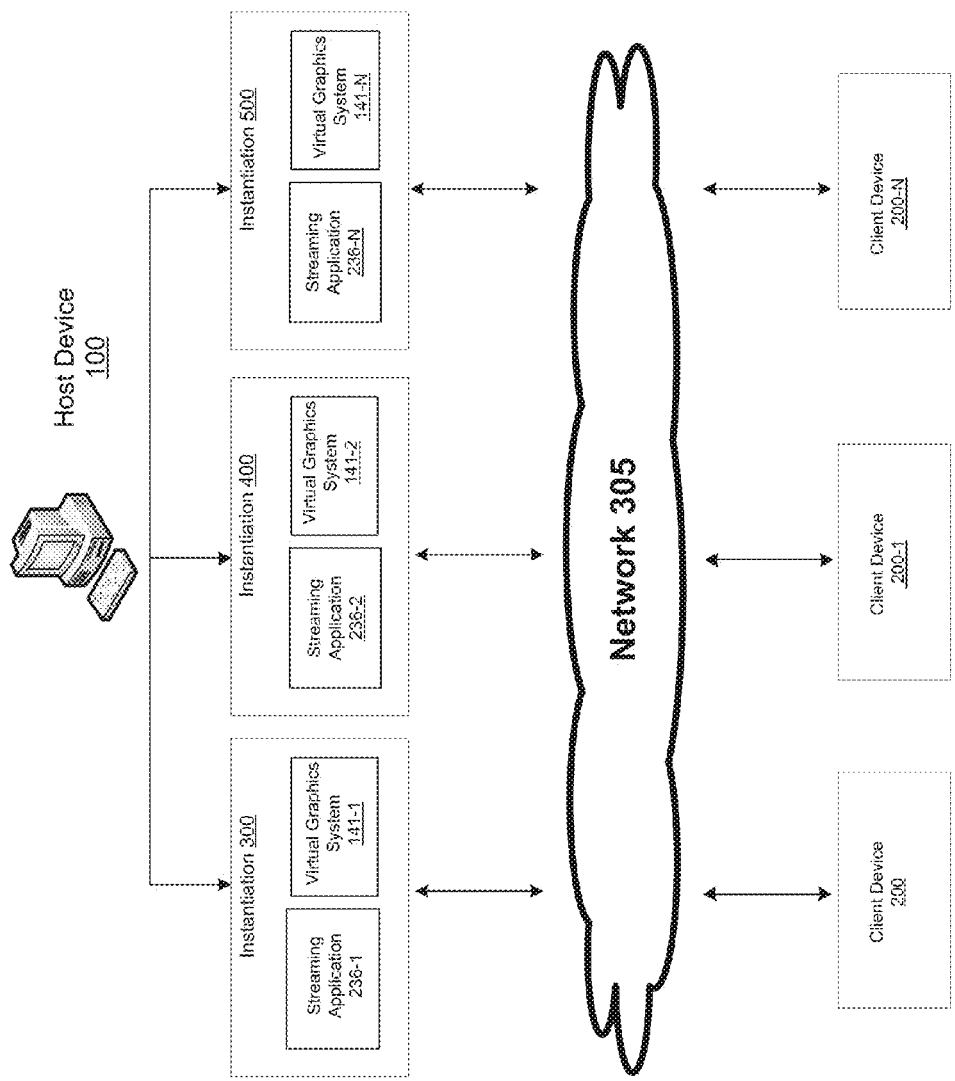
FIG. 6A provides an illustration depicting the flow of data between a client device and a host device in accordance with embodiments of the present invention.

FIG. 6A provides another exemplary network communication involving host device 100 and a plurality of client devices similar to client device 200 of FIG. 1 in accordance with embodiments of the present invention. FIG. 6A illustrates the multi-threaded nature of the embodiments of the present invention and how embodiments of the present invention are operable to throttle the frame generation rate of virtualized graphics systems in response to feedback regarding network conditions (e.g., bandwidth usage, network traffic, etc.) during the multi-threaded execution of an application streamed from a host device.

Host device 100 may be communicatively coupled to a number of client devices over a given network, such as client devices 200 through 200-N over network 305. Client devices 200 through 200-N are depicted in FIG. 6A as remote devices that are independent of host device 100. In one embodiment, with reference to FIG. 6A, streaming application 236 residing in memory 135 of host device 100 may be executed by client devices 200 through 200-N with each device having their own instantiation of streaming application 236 (instantiation 300, instantiation 400 and instantiation 500, respectively illustrated in FIG. 6A).

According to one embodiment of the present invention, host device 100 executes streaming application 236 to generate output data, which is transmitted to the client devices 200 through 200-N via the network 305. The output data of streaming application 236 may be encoded (compressed) which is then decoded and uncompressed by client devices 200 through 200-N. In one embodiment of the present invention, these client devices may be stateless in the sense that streaming application 236 is not installed on them. Rather, client devices 200 through 200-N may rely on host device 100 to store and execute streaming application 236. Furthermore, in response to the inputs from the client devices 200 to 200-N, virtual graphics systems (e.g., virtual graphics systems 141-1 through 141-N) may be used by embodiments of the present invention to generate display data. The display data can be encoded using a common, widely used, and standardized scheme such as H.264.

With reference to FIG. 6A, according to one embodiment of the present invention, instantiation 300 comprises virtual graphics system 141-1 and streaming application 236-1. Virtual graphics system 141-1 is utilized by the streaming application 236-1 to generate display data (output data) related to streaming application 236-1. The display data related to instantiation 300 is sent to client device 200 over network 305.

Similarly, instantiation 400 comprises virtual graphics system 141-2 and streaming application 236-2. In parallel, in response to the inputs from the client device 200-1, virtual graphics system 141-2 is utilized by streaming application 236-2 of instantiation 400 to generate display data (output data) related to streaming application 236-2. The display data related to instantiation 400 is sent to client device 200-1 over network 305.

Furthermore, instantiation 500 comprises virtual graphics system 141-N and streaming application 236-N. In parallel, in response to the inputs from the client device 200-N, virtual graphics system 141-N is utilized by steaming application 236-N of instantiation 500 to generate display data (output data) related to streaming application 236-N. The display data related to instantiation 500 is sent to client device 200-N over network 305.

In the manner described herein with regards to embodiments of the present invention, host device 100 is operable to throttle the frame generation rate of each of the virtualized graphics systems (e.g., virtual graphics systems 141-1 through 141-N) in response to feedback regarding the network conditions of network 305 during the multi-threaded execution of applications streamed from host device 100 (e.g., streaming applications 236-1 through 236-N).

Figure 6B:
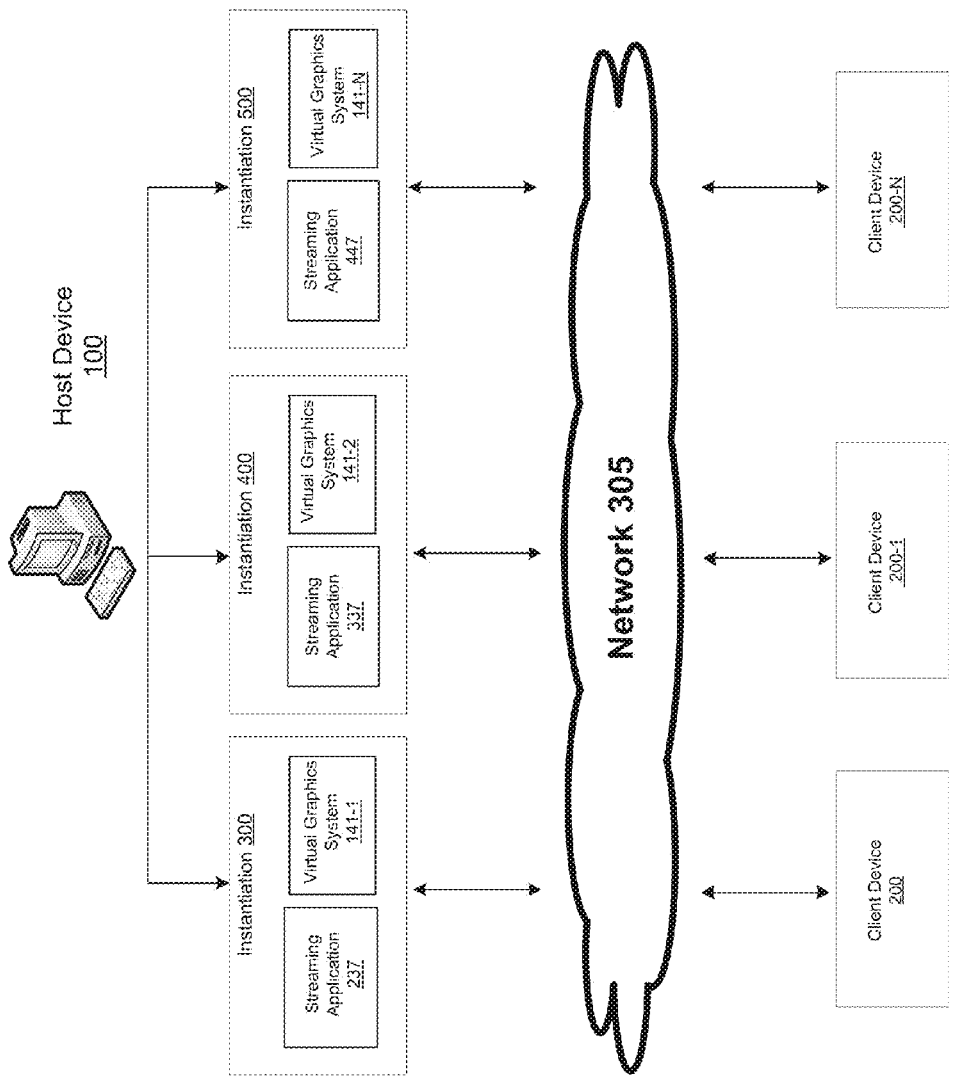
FIG. 6B provides another illustration depicting the flow of data between a client device and a host device in accordance with embodiments of the present invention.

As illustrated in FIG. 6B, alternatively, client devices 200 through 200-N may each receive different applications. In one embodiment, client device 200 may receive streaming application 237 from the host device 100 over the network 305. In parallel, client device 200-1 may receive streaming application 337 from host device 100 over network 305. Similarly, also in parallel, client devices 200-N may receive streaming application 447 from host device 100 over the network 305.

In the manner described herein with regards to embodiments of the present invention, host device 100 is operable to throttle the frame generation rate of each of the virtualized graphics systems (e.g., virtual graphics systems 141-1 through 141-N) in response to feedback regarding the network conditions of network 305 during the multi-threaded execution of applications streamed from host device 100 (e.g., streaming applications 237 through 447).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of throttling an application responsive to a communication network condition, said method comprising:
   monitoring said communication network condition of a communication network using a host device, said host device communicatively coupled to a plurality of remote devices over said communication network, wherein said host device is operable to monitor said communication network condition in real-time based in part by determined transmission rates of frames from said host device received by said remote devices;
   determining a frame generation rate associated with said application using said host device, wherein said host device uses a graphics processor residing therein for generating frames for said application at said frame generation rate; and
   adjusting said frame generation rate of said graphics processor responsive to said communication network condition when said communication network condition exceeds a threshold, wherein the adjusting comprises signaling said graphics processor to alter a timing of when said graphics processor responds to a request made by said application to begin rendering a new frame.

2. The method of throttling an application described in claim 1, wherein said monitoring further comprises:
   determining a network bandwidth of said communication network using a network status signal comprising data associated with said communication network condition.

3. The method of throttling an application described in claim 1, wherein said adjusting said frame generation rate comprises synchronizing said frame generation rate with a virtualized VBlank signal generated at said host device.

4. The method of throttling an application described in claim 1, wherein said adjusting said frame generation rate comprises synchronizing said frame generation rate with a virtual VSync signal generated at said host device.

5. The method of throttling an application described in claim 3, wherein said virtual VBlank signal is generated by a software module resident on the host device.

6. The method of throttling an application described in claim 1, wherein said host device comprises a virtual graphics processor, wherein said virtual graphics processor is operable to execute multiple instantiations of said application in parallel for streaming display output to said plurality of remote devices over said communication network.

7. The method of throttling an application described in claim 2, wherein said network status signal is transmitted at fixed time intervals.

8. The method of throttling an application described in claim 2, wherein said network status signal is transmitted at varying time intervals.

9. for throttling an application responsive to a network condition, said system comprising:
- a memory device configured to store a plurality of programmed instructions; and
- a graphics processor configured to execute the plurality of programmed instructions in order to implement:
  - a streaming module operable to stream display output data of said application to a client device of a plurality of client devices over a network;
  - a network monitoring module operable to monitor said network condition over said network based in part by determined transmission rates of frames from said a host device received by said remote devices, wherein said graphics processor resides in said host device;
  - a determination module operable to determine a frame generation rate associated with said application; and
  - a synchronization module for adjusting said frame generation rate of said graphics processor responsive to said communication network condition when said communication network condition exceeds a threshold, wherein the adjusting comprises signaling said graphics processor to alter a timing of when said graphics processor responds to a request made by said application to begin rendering a new frame.

10. The system for throttling an application described in claim 9, wherein said network monitoring module is further operable to determine a network bandwidth of said network using a network status signal comprising data associated with said communication network condition.

11. The system for throttling an application described in claim 9, wherein said synchronization module is operable to synchronize said frame generation rate with the presence of a virtualized VBlank signal.

12. The system for throttling an application described in claim 9, wherein said synchronization module is operable to synchronize said frame generation rate using a virtual VSync signal.

13. The system for throttling an application described in claim 11, wherein said virtualized VBlank signal is generated from a software module.

14. The system for throttling an application described in claim 10, wherein said network status signal is transmitted at fixed time intervals.

15. The system for throttling an application described in claim 10, wherein said network status signal is transmitted at varying time intervals.

16. A method of throttling an application responsive to a network condition, said method comprising:
- receiving a network status signal comprising data associated with said network condition from a network module of a host device, said host device coupled to a client device through a network, wherein said network condition is associated with said network and time and based in part by determined transmission rates of frames from said host device received by said remote devices;
- determining a frame generation rate associated with said application using said host device wherein said application is resident on said host device; and
- dynamically adjusting said frame generation rate of a graphics processor responsive to said network condition using a signal when said network condition exceeds a threshold, wherein the adjusting comprises signaling said graphics processor to alter a timing of when said graphics processor responds to a request made by said application to begin rendering a new frame, wherein said graphics processor resides in said host device.

17. The method of throttling an application described in claim 16, wherein said network status signal is operable to determine a network bandwidth of said network.

18. The method of throttling an application described in claim 16, wherein said signal is operable to synchronize said frame generation rate with a virtual VBlank signal.

19. The method of throttling an application described in claim 16, wherein said signal is operable to synchronize said frame generation rate with a virtual VSync signal.

20. The method of throttling an application described in claim 18, wherein said virtual VBlank signal is generated from a software module resident on said host device.

21. The method of throttling an application described in claim 20, wherein said software module is a display driver.

* * * * *